US012567045B2

(12) United States Patent
Nuzzi

(10) Patent No.: US 12,567,045 B2
(45) Date of Patent: Mar. 3, 2026

(54) SYSTEM AND METHOD FOR PERSONALIZED TELLER SERVICES USING ENCRYPTION BASED SHARED ARCHITECTURE

(71) Applicant: PAYPAL, INC., San Jose, CA (US)

(72) Inventor: Frank Anthony Nuzzi, Pflugerville, TX (US)

(73) Assignee: PAYPAL, INC., San Jose, CA (US)

( * ) Notice: Subject to any disclaimer, the term of this patent is extended or adjusted under 35 U.S.C. 154(b) by 300 days.

(21) Appl. No.: 17/518,497

(22) Filed: Nov. 3, 2021

(65) Prior Publication Data

US 2022/0164780 A1      May 26, 2022

Related U.S. Application Data

(63) Continuation of application No. 15/857,548, filed on Dec. 28, 2017, now abandoned.

(51) Int. Cl.
G06Q 20/10 (2012.01)
G06Q 20/06 (2012.01)
H04W 4/021 (2018.01)

(52) U.S. Cl.
CPC ....... G06Q 20/1085 (2013.01); G06Q 20/065 (2013.01); H04W 4/021 (2013.01)

(58) Field of Classification Search
CPC .. G06Q 20/1085; G06Q 20/065; H04W 4/021
See application file for complete search history.

(56) References Cited

U.S. PATENT DOCUMENTS

| | | | |
|---|---|---|---|
| 10,034,131 B1 | 7/2018 | Akhter et al. | |
| 10,068,228 B1 * | 9/2018 | Winklevoss | G06Q 20/34 |
| 10,296,764 B1 | 5/2019 | Batishchev | |
| 2009/0326811 A1 | 12/2009 | Luoma et al. | |
| 2016/0132965 A1 * | 5/2016 | Malhotra | G06Q 40/04 |
| | | | 705/37 |
| 2016/0203478 A1 | 7/2016 | Gardiner et al. | |
| 2016/0224969 A1 * | 8/2016 | Hwang | G06Q 20/381 |
| 2017/0076306 A1 * | 3/2017 | Snider | G06Q 30/0205 |
| 2018/0033235 A1 | 2/2018 | Dotterweich et al. | |

* cited by examiner

*Primary Examiner* — John W Hayes
*Assistant Examiner* — Zehra Raza
(74) *Attorney, Agent, or Firm* — Haynes and Boone, LLP

(57) ABSTRACT

Aspects of the present disclosure involve systems, methods, devices, and the like for enabling teller based services using an encryption based shared architecture. The teller based service is provided by at least one node or entity in a blockchain. A request and communication between the at least one node and a user, with indication of the node geolocation and ability to provide teller services is exchanged. The node provides access to cash, enables the verification of the user, and updates the ledger upon completion of the transaction.

20 Claims, 6 Drawing Sheets

100

106

104

108

104

108

102

108

500

502   TRANSMIT TELLER SERVICE REQUEST

504   RECEIVE SERVICE REQUEST RESPONSE

506   IS GEOLOCATION WITHIN GEOFENCE

NO

YES

508   TRANSMIT TRANSACTION INFORMATION AND LOCATION DETAILS

510   TRANSACT WITH THE SELECTED WALLET HOLDER AND PROCESS TRANSACTION

512   RECEIVE CONFIRMATION OF LEDGER UPDATE

SYSTEM AND METHOD FOR PERSONALIZED TELLER SERVICES USING ENCRYPTION BASED SHARED ARCHITECTURE

CROSS-REFERENCE TO RELATED APPLICATION

The present application is a continuation of U.S. patent application Ser. No. 15/857,548, filed Dec. 28, 2017, all of which is incorporated by reference herein in its entirety.

TECHNICAL FIELD

The present disclosure generally relates to encryption based share architectures, and more specifically, to teller services using encryption based shared architectures.

BACKGROUND

Rapid advancements in technology and communications have led to the ubiquitous use of wireless electronics. As such, today's society has grown to become heavily device reliant. This reliance has led to the use of electronics to make monetary transactions for goods and services. For example, a smartphone may now be used to complete a purchase transaction at a merchant location. Unfortunately, the withdrawal of cash and teller like services is often limited to the use of an automated teller machine from a financial institution and the user needs to be affiliated with the institution. With the grown of cryptocurrency, it would be beneficial if a system were created that could provide access to cash and other teller based service from a distributed network node or entity.

Figure 1C:
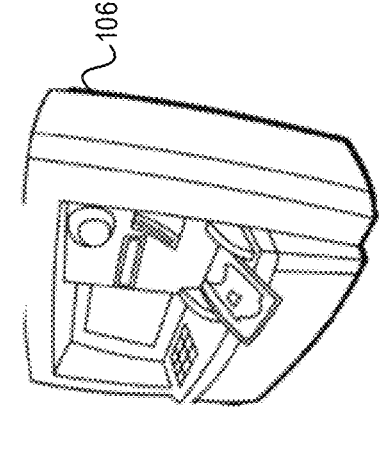
FIGS. 1A-1C illustrates block diagrams of a first user interaction with one or more devices for performing a transaction.
Figure 1C:
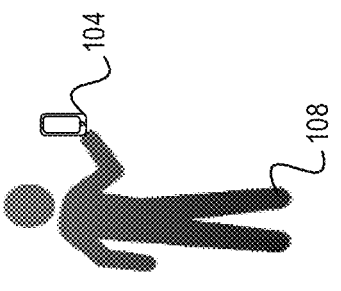

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for enabling teller based services using an encryption based shared architecture. The teller based service is provided by at least one node or entity in a blockchain. A request and communication between the at least one node and a user, with indication of the node geolocation and ability to provide teller services is exchanged. The node provides access to cash, enables the verification of the user, and updates the ledger upon completion of the transaction.

Rapid advances in communications have made portable electronic devices, such as smartphones and tablets, part of everyday life. Among other things, these electronic devices can be used to browse the web and stream video, and purchase goods and services. In some instances, one or more electronic devices can be used to make the purchase. However, in some instances the establishment, event, service, or the like may have cash only restrictions, making the use of the electronic device useless.

Conventionally, the withdrawal of cash has occurred at an automated teller machine (ATM) using a physical bank card. The user inputs the bank card into the ATM, enters some authentication and transactional information, and the cash is dispensed. Dispensing of cash in such manner, however, may be cumbersome, costly, and inconvenient for users. For example, a user who is a customer to a specific bank, may need to search for an ATM machine associated with that bank in order to avoid fees. As another example, the bank card needs to be carried by the user for completing the cash transaction. Carrying the bank card can lead to a card that is lost or stolen. In addition, the lost/stolen card may cause the user to be subject to loss of money (due to an authorized transaction), identity theft, stress, and frustration.

Figure 1B:
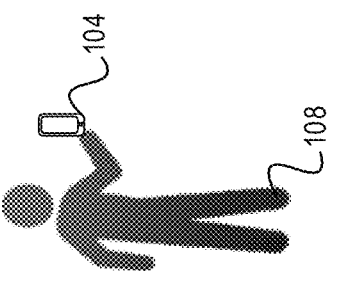
Figure 1A:
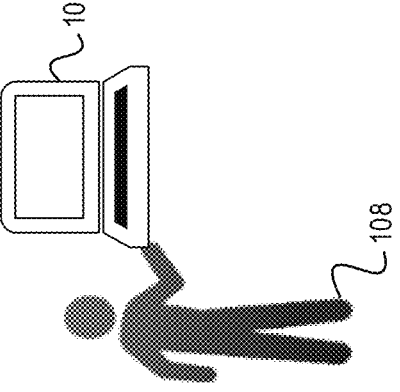

To illustrate this, FIGS. 1A-1C, include block diagrams of a user interaction with one or more devices for performing a transaction. In FIG. 1A, a user 108 is interacting with a personal device 102 for performing one or more transactions. The personal device 102 may be a tablet, laptop, pc, or the like. For exemplary purposes, personal device 102 can be a laptop. As illustrated in FIG. 1, user 108 is communicating with personal device 102. Generally, personal device 102 can be used for numerous tasks including but not limited to web browsing, video streaming, bill pay, and purchase of goods and services. However, a personal device 102 such as a laptop may be limited in use with regards to accessing cash disbursements and would not be useful in instances where indeed cash is needed to be withdrawn.

FIG. 1B illustrates user 108 interacting with a user device 104 for performing one or more transactions. The user device 104 may be a tablet, iPad, cell phone or the like. For exemplary purposes, user device 104 can be a smart phone. The smart phone may be equipped with various applications for performing similar tasks as indicated with personal device 102. For example, the user device 104 may be used for web browsing, video streaming, bill payments, and online purchases. Additionally, the user device 104 be equipped with applications that enable the user to make purchases using a payment provider application and/or a digital wallet. Further, the user device 104 is capable of making phone calls and communicating with one or more other communications devices using a cellular network, Wi-Fi, Bluetooth, BLE, NFC, WLAN, etc. The communication can enable the transmission of information from a user account to a secondary source. For example, the user device 104 can be used to make a purchase for a good or service using an application or digital wallet. Here, although the user device 102 is portable and accessible for purchases, the conventional smart phone is limited by the ability to withdraw, deposit, and/or handle cash. Instead, a bank card is needed for the withdrawal and used for the dispensing of cash by an automated teller machine, merchant point-of-sale (POS) device or other similar device. Further, the bank card is largely limited in its use to ATM machines affiliated with the bank.

FIG. 1C illustrates a user 108 interacting with one or more devices 104, 106 for performing a transaction. As an example, user 108 is simultaneously interacting with an ATM 106 and user device 104. As indicated, although many tasks may be performed using a user device 104, the ability to withdrawal and/or deposit cash is limited. As such, a user 108 is often reliant on an external device such as ATM 106 for the access of cash. This however, may lead to frustration of a user 108, the use of an ATM 106 may lead to lost/stolen cards and limited funding available or desire to use banking funds. Therefore, in order to mitigate these inconveniences, a method and system is introduced that alleviates such disadvantages.

In a current embodiment, a system and method is introduced that enables personal teller services and cash access that uses an encryption based shared architecture. In particular, a system is introduced that enables the use of a distributed encryption based system with shared architecture such as blockchain for cash access. Blockchain is cyptocurrency technology that bundles currency transactions in a digital ledger that maintains the transaction in chronological order and publically available. The bundled currency transactions are collected and placed in a Blockchain block. Each block within the Blockchain is cryptographically signed which creates a block hash. The block hash becomes what appears to look like a random string of numbers that get appended in the next block and in turned hashed as well. The links of blocks come together to build a chain of blocks. The blocks are shared over a network of computers which can verify the contents of each block and can reconstruct each block as each computer is designed to apply the same protocol rules in this technology.

Figure 2:
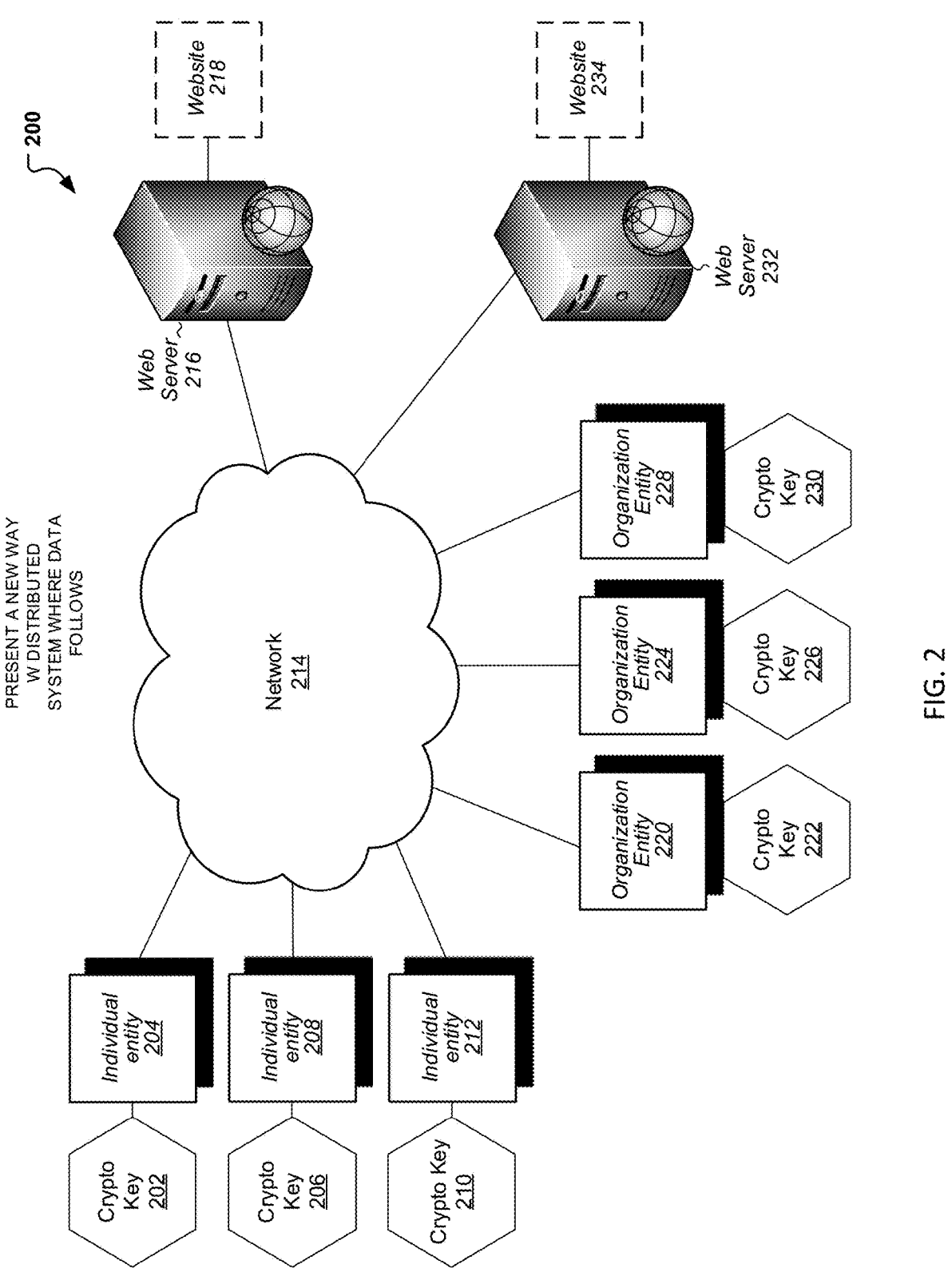
FIG. 2 illustrates a block diagram of a distributed network system using an encryption based shared architecture.

FIG. 2 provides an illustration of such network and in particular FIG. 2 illustrates a block diagram of a distributed network system using an encryption based shared architecture. In this diagram, system 100 includes individual entities and their associated crypto (cryptographic) keys, as well as organization entities and their associated crypto keys. The diagram also depicts web servers that correspond to particular websites. Thus, the diagram of FIG. 1 shows overall aspects of an ecosystem in which the techniques below can be deployed, in various embodiments. Note that other permutations of this figure are contemplated (as with all figures). While certain connections are shown (e.g. data link connections) between different components, in various embodiments, additional connections and/or components may exist that are not depicted. Further, components may be combined with one other and/or separated into one or more systems.

The ecosystem 200 of FIG. 2 also includes both individuals and organizations. Individual entities 204, 208, and 212 may correspond to individual users who may be situated anywhere on the globe. In some instances, these users may be relatively unknown persons—e.g., people who may not have provided identifying credentials to one of the organizations. Nonetheless, these individuals may be uniquely identifiable in the ecosystem through the use of their associated crypto keys 202, 206, and 210.

Organization entities 220, 224, and 228 may correspond to particular organizations, which may be financial entities in some embodiments. Thus, these entities can include an electronic payment transaction service provider such as PayPal™, a credit card network operator such as VISA™ or DISCOVER™, an issuing bank or an acquirer bank, or any other such entity. Organization entities may thus be legal entities, such as businesses or charities, in various instances, but are also not limited to financial entities. The organization can be coffee shops, grocery stores, and other retailers/marketplaces.

Web servers 216 and 232 correspond to websites 218 and 234, respectively. These websites can be any website on the Internet in various embodiments. In many cases, these websites include goods and services for sale by merchants who utilize an organization entity to help facilitate payments.

Note that these entities and servers may be distributed over a large geographical location, across states, countries, or even the world. A benefit to the distributed nature of this system is the ability to use the network as a personal automated teller machine (ATM) network.

A distributed network such as system 200 with encryption based shared architecture, is designed to provide a transparency as to the currency a user 108 owns. However, obtaining cash from this online system may be a challenge as cyptocurrency brokers or exchange locations are often needed. A cryptocurrency broker may help maintain the cryptocurrency wallet, however the process of getting funds out, often requires a bank or other similar transfer.

In a current embodiment, a system and method is introduced that enable personal teller services using the distributed network of system 200 by exposing a geolocation of the blockchain node. The intent of the information is to use the location of the wallet holder for access to ATM like services without the need to wait for a bank transfer, can use their cryptocurrency, and avoid the use of cash funds available at a financial institution. Thus, by using the wallet holders as a source for funds, the user 108 is able to reliably have access to liquidity without the need for a cryptocurrency broker or exchange.

Figure 3:
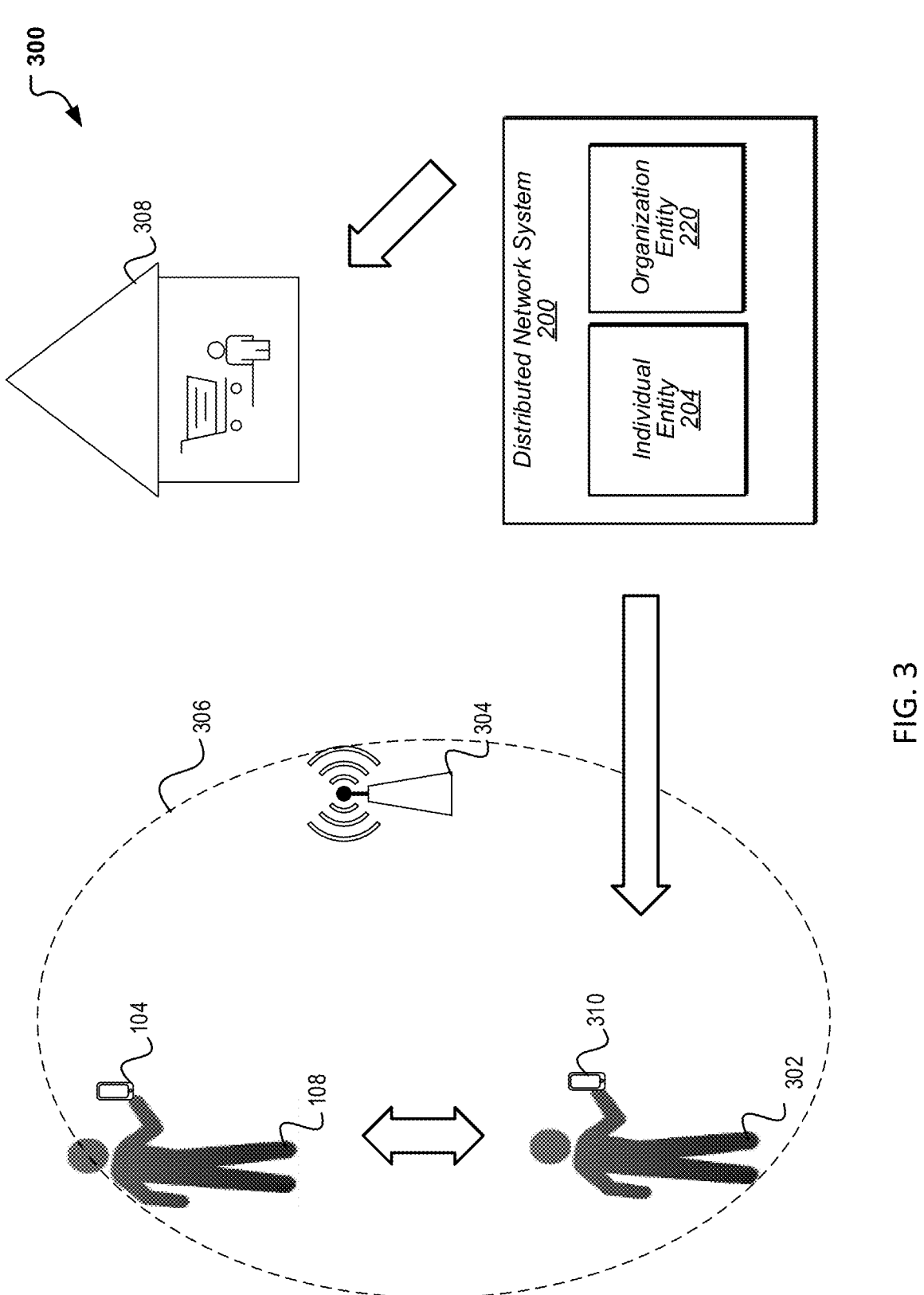
FIG. 3 illustrates a block diagram of a computer system that may be used within the present architecture for providing encryption based shared architecture for teller based transactions.

FIG. 3 provides an exemplary block diagram 300 of a personalized teller transaction using a distributed network system. In particular, FIG. 3 illustrates a system where user 108 who has a blockchain or other encryption based shared architecture for use in retrieving cryptocurrency. As illustrated in block diagram 300, user 108 is part of distributed network system 200. As previously indicated, the distributed network system 200, can include individual and organization entities 204,220 with whom user 108 has previously transacted. As such, these individual and organization entities 204, 220 have verified user 108. In the current embodiment, user 108 can transmit a notice and request for teller services from one or more of the entities in the distributed network system 200. In the instance that the user 108 is in need of access to his/her cryptocurrency, the user's notice may indicate the desire to transact, request for an indication of the desire to do so from the entity and location information.

Individual entity 204, can then respond with an agreement to transact with user 108 and provide or enable to transmission of the geolocation of the individual entity 204. As an example, individual entity 204 can include user 302 accessible via a user device 310. The user 302, can transmit geolocation information to user 108 and their ability to participate in teller services. If the geographical location and response from the user 302 corresponding to the individual entity 204 is agreeable to user 108, then a communication between the parties may be initiated where details on the transaction may be exchanged and details on time and location can be finalized.

The determination as to whether a user 108 should transact with user 302 can be based in part on a distance of travel. For example, in some instances, the user 108 can identify a user 302 based on a predefined distance. The distance between users 108,302 which can be determined based on the geolocation transmitted by user 302 and predefined distance can be defined by a geofence 306. The geofence 306 can be a product of a cellular area defined by a tower 304, beacon, or distance from user device 104.

Notice that the user's distributed network system 200, can also include organization entity 220. The organization entity 220 can be a department store, coffee shop, grocery store, retail shop or the like. For exemplary purposes, the organizational entity 220 is illustrated as retail 308. Note that user 108 can also send a request for teller services from retail 308. In block diagram 300, the retail 308 may respond with a geolocation that is greater than preferred by user 108 or beyond the geofence 306. Alternatively, the retail 308 can respond with a negative response to the desire to provide teller based services to user 108.

Block diagram 300 provides the ability for a user 108 to access to his/her cryptocurrency without the need to access a cryptocurrency broker. The entity 204, 220 can provide teller based services to a user 108 who has previously been verified. In addition, the individual and/or organization entity 204, 220 can provide convenient access within proximity to the user 108. For example, individual entity 204 may arrange to deliver, meet at a location, arrange for a delivery, etc. In addition, the entity 204 and the user 108 can designate a convenient time/date for the transaction. Note that in addition, other entities, location preferences, exchange rates, currency types, etc. are available. System diagram 300 is used for exemplary purposes and not restricting.

Figure 4:
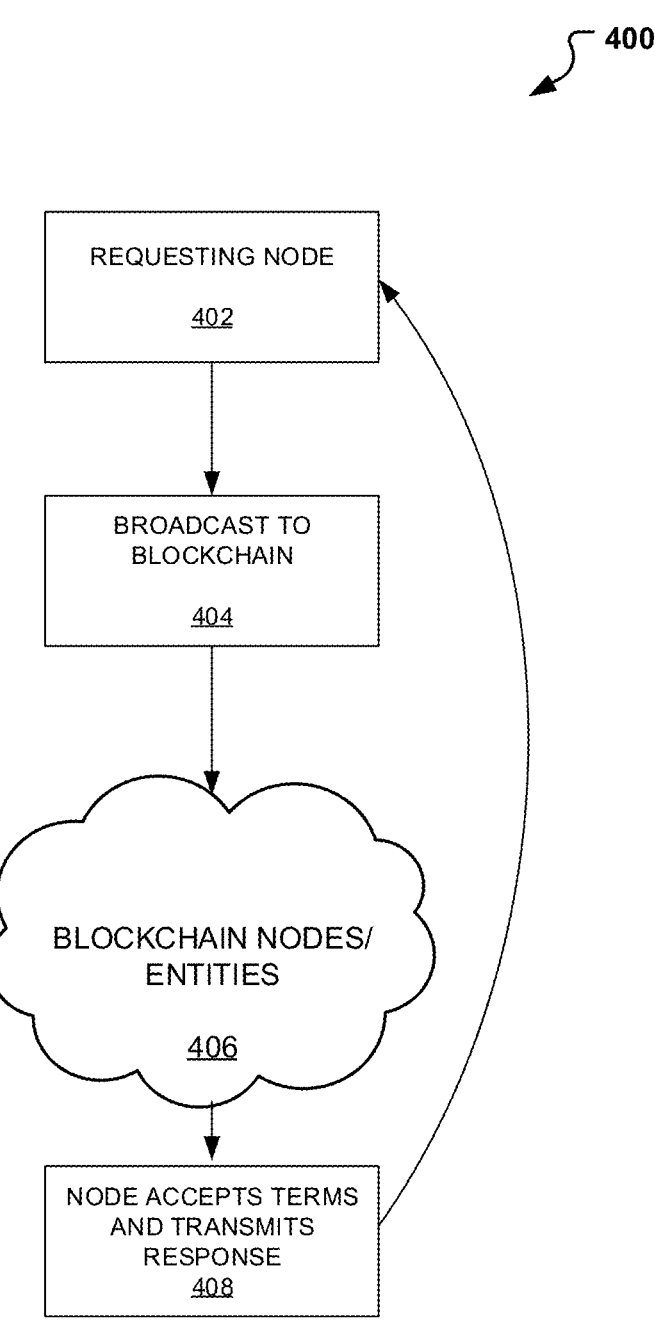
FIG. 4 illustrates a block diagram of a node to node negotiation for teller based transactions using a distributed network system.

To illustrate how the interaction between the user 108 and node/entity 202, 204 for the negotiation of a teller based transaction, FIG. 4 is included. To initiate an ATM (or teller based) service request, user 108 at requesting node 402, can begin by broadcasting notification to nodes within its blockchain that are located within a geofenced area from the user 108. If additional nodes respond outside the desired geolocation of the user 108, a filtering mechanism can occur which can eliminate those nodes from consideration.

The notification from the user 108 can include a request for the interested node to respond if able to provide teller based services. In addition, the broadcast notification can include a dollar amount or range interested and would need available for transacting. Other details that may also be included in the notification include a conversation rate the user is willing to pay, suggested exchange spot or location meetup and responder's node address for continued communication. Note that other details may be included in the broadcast which may be relevant to the transaction. Additionally, at least some of the details mentioned may be withheld until a candidate node has been identified.

The notification by the user 102, is broadcast to the blockchain 406 and to the various nodes or entities. The nodes interested in participating in the transaction and able to provide teller based services may then transmit a response with a notification 408 indicating an agreement to provide the services, participate in the transaction, and respond with the additional details requested by the user 108. For example, the interested node(s) may respond with their geolocation, agreement to the conversion rate suggested and/or provide a counter rate for negotiation, agreement or indication of an exchange location, node address, wallet address, and other relevant details.

Upon receipt of the transmission from the interested node(s), a two-way communication can begin between the selected node providing the teller based services and the user 108. The two way communication can include the confirmation of receipt response form the node and counter response to any counteroffers and negotiations that may have occurred between the two. For example, the final conversion rate, dollar amount, location, time, etc.

Note that FIG. 4 is for illustration purposes only and not restricted as transaction details may occur at varying parts of the communication as well as the designation as to the node to use.

Figure 5:
FIG. 5 illustrates a flow diagram of a method for providing personal teller services using the encryption based shared architecture.
Figure 5:
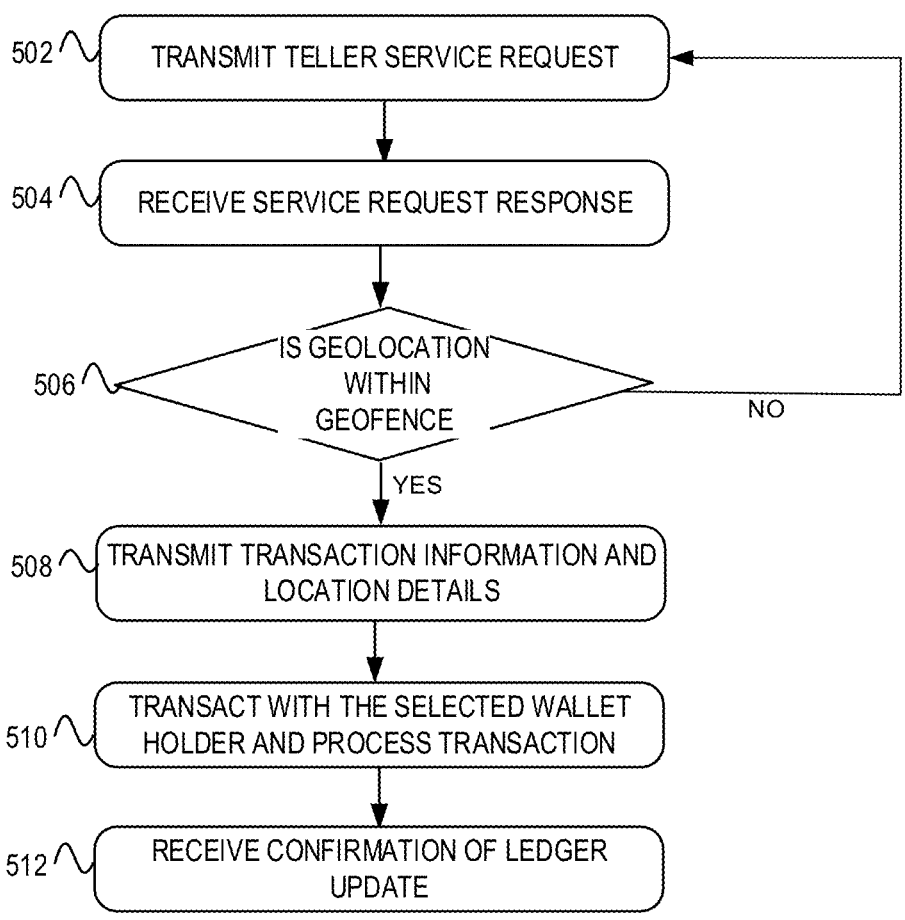

FIG. 5 illustrates an example process 500 for completing a teller based transaction using an encryption based shared architecture, as described by the block diagrams of FIGS. 2-4. In particular, FIG. 5 includes a flow diagram illustrating operations for withdrawing cash and transacting using a distributed network system. According to some embodiments, process 500 may include one or more of operations 502-512, which may be implemented, at least in part, in the form of executable code stored on a non-transitory, tangible, machine readable media that, when run on one or more hardware processors, may cause a system to perform one or more of the operations 502-512.

Process 500 begins with operation 502, where a user associated with a user device and further associated with a blockchain, transmits to nodes or entities on a distributed network system a request for teller based services. As indicated above and in conjunction with FIGS. 2-4, the distributed network system can include individual and organization entities designed to transact and using cryptocurrency via hashed ledger technology. Each transaction of the blockchain has verified the user in the transaction and is able trace back the previous transaction through the chain.

At operation 502, the user transmits a request for nodes/entities for a request for teller based services. The request can include user preferences including distance, time, date, conversion rate, and dollar amount range desired. Once a response to the request is received, the node or entity can respond 504 with details regarding the acceptance of the service request. In addition, to other details regarding location, availability, fund range available (e.g., can transact in the $50-200 range), etc. Additionally, the node indicates its geolocation and/or meet up locations. Once the response is received, a determination is made by the user whether the geolocation(s) indicated by the entity are within the preferred geofence. If the location is not acceptable, the user may transmit another request for teller services to other nodes with a return to operation 502. Alternatively, if other data within the response are unacceptable to the user, the user may pass on the entity and return to operation 502. For example, if the conversion rate, convenience fee, or $ amount required for the transaction do not fit within the user's transaction preferences, the user may re-broadcast to other entities.

If however, the geolocation is within the user's preference, process 500 continues to operation 508. Additionally, process 500 continues to operation 508 if for example the information received is negotiable and/or is accepted under a condition or counteroffer. For example, the user may continue to accept to transact with the entity however, does so under the condition that the convenience fee is decreased by 10%. In addition, in operation 508, a private communication between the nodes can occur, wherein arrangements are made such that the entity and user to meet to complete the transaction. At operation 510, the user meets with the entity (another user or arrives at retail location) for the completion of the transaction. Operation 512 is completed with the update of the user ledger confirming the withdrawal of the cryptocurrency.

Figure 6:
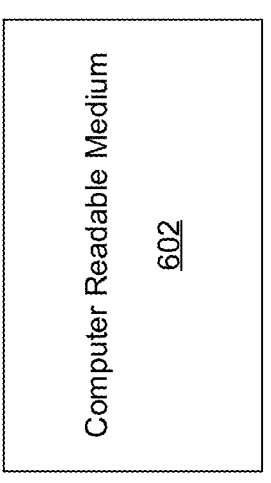
FIG. 6 illustrates a block diagram of a computer readable medium, according to some embodiments.

FIG. 6 illustrates, in block diagram format, an example embodiment of a computer-readable medium 600. This computer-readable medium may store instructions corresponding to the operations of FIG. 5 and/or any techniques described herein. Thus, in one embodiment, instructions corresponding to operating entity system 200 may be stored on computer-readable medium 600.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript. Note that as used herein, the term "computer-readable medium" refers to a non-transitory computer readable medium.

Figure 7:
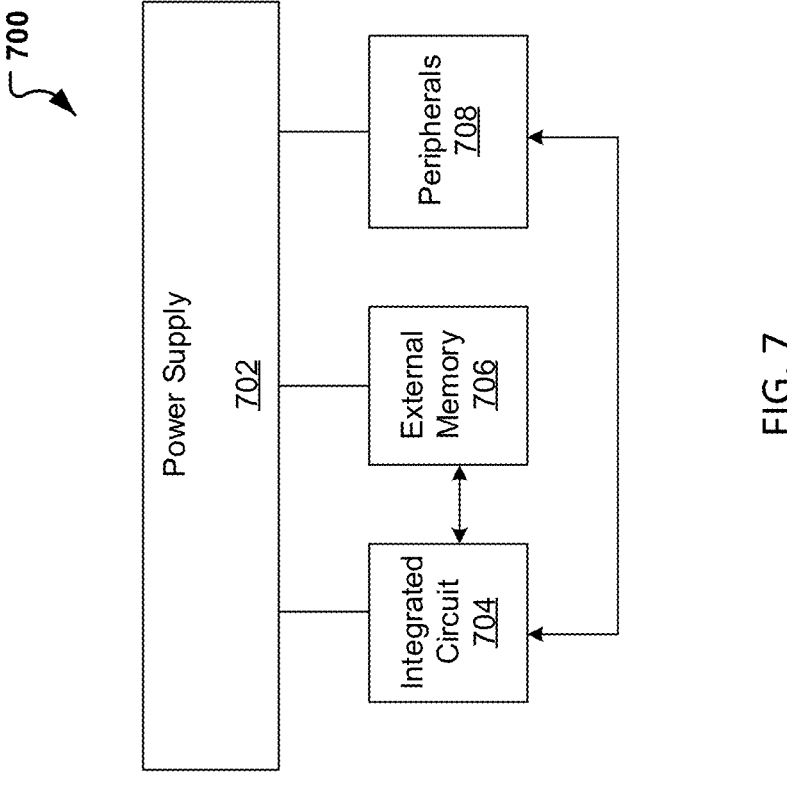
FIG. 7 illustrates an example block diagram of a computer system suitable for implementing one or more devices of the communication systems of FIGS. 1-6.

Turning to FIG. 7, one embodiment of a computer system 700 is illustrated. Various embodiments of this system may be operating personal teller system 200 or any other computer system as discussed above and herein.

In the illustrated embodiment, system 700 includes at least one instance of an integrated circuit (processor) 704 coupled to an external memory 706. The external memory 706 may form a main memory subsystem in one embodiment. The integrated circuit 704 is coupled to one or more peripherals 708 and the external memory 706. A power supply 702 is also provided which supplies one or more supply voltages to the integrated circuit 704 as well as one or more supply voltages to the memory 706 and/or the peripherals 708. In some embodiments, more than one instance of the integrated circuit 704 may be included (and more than one external memory 706 may be included as well).

The memory 706 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 704 in a chip-on-chip configuration, a package-on-package configuration, or a multi-chip module configuration.

The peripherals 708 may include any desired circuitry, depending on the type of system 700. For example, in one embodiment, the system 700 may be a mobile device (e.g. personal digital assistant (PDA), smart phone, etc.) and the peripherals 708 may include devices for various types of wireless communication, such as WiFi, Bluetooth, cellular, global positioning system, etc. Peripherals 708 may include one or more network access cards. The peripherals 708 may also include additional storage, including RAM storage, solid state storage, or disk storage. The peripherals 708 may include user interface devices such as a display screen, including touch display screens or multitouch display screens, keyboard or other input devices, microphones, speakers, etc. In other embodiments, the system 700 may be any type of computing system (e.g. desktop personal computer, server, laptop, workstation, net top etc.). Peripherals 708 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising
a non-transitory memory storing instructions; and
a processor configured to execute the instructions to cause
the system to perform operations comprising:
receiving, on a distributed network, a request sent to a plurality of nodes for an automated teller machine service for an exchange of cryptocurrency in a digital wallet to funds usable at a location of a device;
determining a user associated with the request based on a cryptocurrency key stored by the digital wallet and associated with the cryptocurrency requested for the exchange to the funds;
determining the location of the user based on the device associated with the user;

analyzing the request for preferences and transactional information selected by the user of the device;

determining a subset of the plurality of nodes within a geofenced area of the location based on one or more additional cryptocurrency keys associated with the plurality of nodes;

broadcasting, on the distributed network for the subset of the plurality of nodes within the geofenced area of the location, a notification requesting a response from the subset of the plurality of nodes for processing the request for the automated teller machine service;

initiating two-way communications between the system and one of the plurality of nodes, wherein the two-way communications allow for a conversion rate for the exchange of the cryptocurrency to the funds to be set; and exchanging two or more messages between the system and the one of the plurality of nodes using the two-way communications based on the response from the one of the plurality of nodes, wherein the two or more messages are used to set the conversion rate usable when the cryptocurrency is digitally exchanged, wherein the exchanging the two or more messages includes:

determining that the one of the plurality of nodes is associated with the geofenced area when the two or more messages are exchanged, determining that a condition for the exchange from the one of the plurality of nodes corresponds to the preferences and the transactional information selected;

rebroadcasting the notification to other ones of the subset of the plurality of nodes based on the one of the plurality of nodes being associated with the geofenced area and the condition corresponding to the preferences and the transactional information selected, and executing the exchange of the cryptocurrency from digital wallet to another digital wallet based on the conversion rate and the condition.

2. The system of claim 1, wherein the automated teller machine service includes an access to liquidity.

3. The system of claim 1, wherein the another digital wallet is associated with a node on a blockchain in the distributed network.

4. The system of claim 1, wherein the device enables the user to use the digital wallet for the automated teller machine service.

5. The system of claim 1, wherein the broadcasting the notification is based in part on the location determined of the device and the preferences analyzed from the request.

6. The system of claim 1, wherein the distributed network includes a plurality of devices for the plurality of nodes corresponding to one of a retail store or a service provider.

7. The system of claim 1, wherein the request is received in response to a broadcast of the request by the device to a blockchain in the distributed network.

8. A method comprising:

receiving, on a distributed network, a transaction request for an automated teller machine service to a plurality of nodes for an exchange of cryptocurrency in a digital wallet to funds usable at a location of a device;

determining a user associated with the request based on a key stored by the digital wallet and associated with the cryptocurrency requested for the exchange to the funds;

determining the location of the user based on the device associated with the user, analyzing the transaction request for preferences and transactional information selected by the user of the device;

determining a subset of the plurality of nodes within a geofenced area of the location based on one or more additional keys associated with the plurality of nodes;

broadcasting, on the distributed network for the subset of the plurality of nodes within the geofenced area of the location, a notification requesting a response from the subset of the plurality of nodes for processing the request for the automated teller machine service;

initiating two-way communications between a system corresponding to the distributed network and one of the plurality of nodes, wherein the two-way communications allow for a conversion rate for the exchange of the cryptocurrency to the funds to be set; and exchanging two or more messages between the system and the one of the plurality of nodes using the two-way communications based on the response from the one of the plurality of nodes, wherein the two or more messages are used to set the conversion rate usable when the cryptocurrency is digitally exchanged, wherein the exchanging the two or more messages includes:

determining that the one of the plurality of nodes is associated with the geofenced area when the two or more messages are exchanged, determining that a condition for the exchange from the one of the plurality of nodes corresponds to the preferences and the transactional information selected;

rebroadcasting the notification to other ones of the subset of the plurality of nodes based on the one of the plurality of nodes being associated with the geofenced area and the condition corresponding to the preferences and the transactional information selected, and executing the exchange of the cryptocurrency from digital wallet to another digital wallet based on the conversion rate and the condition.

9. The method of claim 8, wherein the automated teller machine service includes an access to liquidity.

10. The method of claim 8, wherein the another digital wallet is associated with a node on a blockchain in the distributed network.

11. The method of claim 8, wherein the device enables the user to use the digital wallet for the automated teller machine service.

12. The method of claim 8, wherein the broadcasting the notification is based in part on the location determined of the device and the preferences analyzed from the request.

13. The method of claim 8, wherein the distributed network includes a plurality of devices for the plurality of nodes corresponding to one of a retail store or a service provider.

14. The method of claim 8, wherein the request is received in response to a broadcast of the request by the device to a blockchain in the distributed network.

15. A non-transitory machine-readable medium having stored thereon machine readable instructions executable to cause a machine to perform operations comprising:

receiving, on a distributed network, a request to a plurality of nodes an automated teller machine service for an exchange of cryptocurrency in a digital wallet to funds usable at a location of a device;

determining a user associated with the request based on a key stored by the digital wallet and associated with the cryptocurrency requested for the exchange to the funds;

determining the location of the user based on the device associated with the user;

analyzing the request for preferences and transactional information selected by the user of the device;

determining a subset of the plurality of nodes within a geofenced area of the location based on one or more additional keys associated with the plurality of nodes;

broadcasting, on the distributed network for the subset of the plurality of nodes within the geofenced area of the location, a notification requesting a response from the subset of the plurality of nodes for processing the request for the automated teller machine service;

initiating two-way communications between a system corresponding to the distributed network and one of the plurality of nodes, wherein the two-way communications allow for a conversion rate for the exchange of the cryptocurrency to the funds to be set; and exchanging two or more messages between the system and the one of the plurality of nodes using the two-way communications based on the response from the one of the plurality of nodes, wherein the two or more messages are used to set the conversion rate usable when the cryptocurrency is digitally exchanged, wherein the exchanging the two or more messages includes:

determining that the one of the plurality of nodes is associated with the geofenced area when the two or more messages are exchanged, determining that a condition for the exchange from the one of the plurality of nodes corresponds to the preferences and the transactional information selected;

rebroadcasting the notification to other ones of the subset of the plurality of nodes based on the one of the plurality of nodes being associated with the geofenced area and the condition corresponding to the preferences and the transactional information selected, and executing the exchange of the cryptocurrency from digital wallet to another digital wallet based on the conversion rate and the condition.

16. The non-transitory machine-readable medium of claim 15, wherein the automated teller machine service includes an access to liquidity.

17. The non-transitory machine-readable medium of claim 15, wherein the another digital wallet is associated with a node on a blockchain in the distributed network.

18. The non-transitory machine-readable medium of claim 15, wherein the device enables the user to use the digital wallet for the automated teller machine service.

19. The non-transitory machine-readable medium of claim 15, wherein the broadcasting the notification is based in part on the location determined of the device and the preferences analyzed from the request.

20. The non-transitory machine-readable medium of claim 15, wherein the distributed network includes a plurality of devices for the plurality of nodes corresponding to one of a retail store or a service provider.

* * * * *